3,023,242
PROCESS FOR THE CONTINUOUS PRODUCTION OF ACRYIC ACID AMIDE
Dieter Bornemann, Haan, Rhineland, Manfred Dohr, Dusseldorf, and Günther Renner and Carl Ziegler, Dusseldorf-Holthausen, Germany, assignors to Henkel & Cie, G.m.b.H., Dusseldorf-Holthausen, Germany, a corporation of Germany
Filed Aug. 17, 1959, Ser. No. 833,961
Claims priority, application Germany Aug. 28, 1958
6 Claims. (Cl. 260—561)

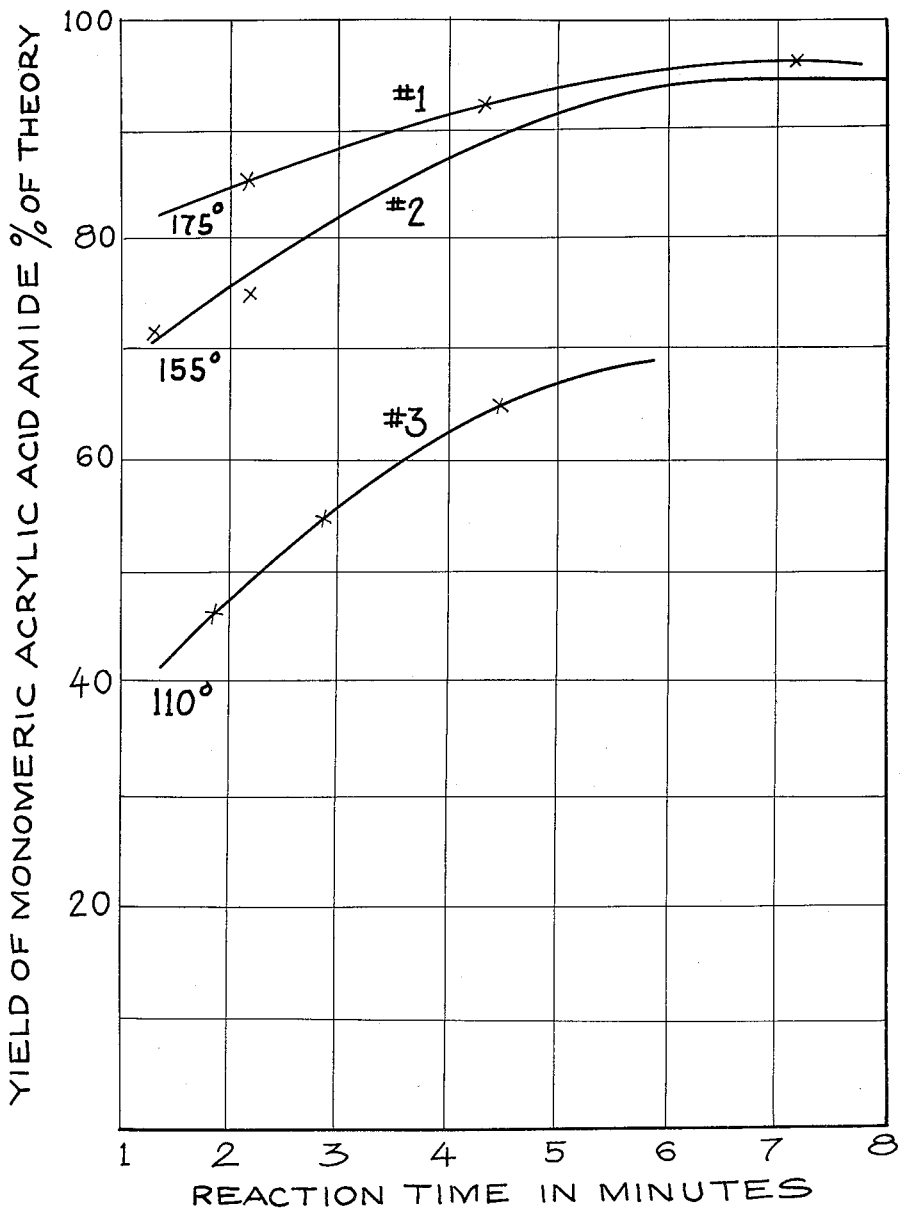

This invention relates to a continuous process for the production of monomeric acrylic acid amide by hydrolysis of acrylonitrile in the presence of sulfuric acid and water at temperatures above 150° C. for short reaction periods.

It is well-known that monomeric acrylic acid amide may be produced by treating acrylonitrile with sulfuric acid and water, subsequently neutralizing the mixture and isolating the monomeric amide therefrom. The hydrolysis of the nitrile into the amide has also been performed in a continuous fashion by continuously withdrawing the reaction product from the reaction vessel while continuously feeding a cold mixture of acrylonitrile, sulfuric acid and water into the heated reaction mixture at practically the same rate. In this known process, temperatures above 120° C. were avoided because, otherwise, a polymerization of the acrylic acid amide would take place.

It is an object of this invention to continuously produce monomeric acrylic acid amide by the hydrolysis of acrylonitrile at high temperatures for short reaction periods.

It is a further object of this invention to continuously produce acrylic acid amide by the hydrolysis of acrylonitrile while avoiding polymerization of the monomeric acrylic acid amide.

These and other objects of this invention will become apparent as the description thereof proceeds.

We have found that the continuous hydrolysis of acrylonitrile into acrylic acid amide with the aid of sulfuric acid and water can be performed particularly advantageously at temperatures above 150° C. using correspondingly reduced reaction periods by continuously introducing the reactants into one end of a heated zone and continuously removing the reaction products from the other end of the heated zone. Under these conditions the acrylonitrile is hydrolyzed into the amide with very good yields, without undergoing any polymerization. This fact is surprising, because it was expected that an increase in the temperature of the hydrolysis reaction would considerably increase the rate of polymerization observed at lower temperatures. An explosive polymerization reaction therefore had been expected, especially since the hydrolysis of the nitrile into the amide is strongly exothermic.

The figure shows graphically the relation of reaction time to the yield of acrylic acid amide at various temperatures.

For the performance of the process according to the invention, the starting materials, acrylontrile, sulfuric acid and water, are preferably used in a molar ratio of 1:1:1. However, the amount of sulfuric acid which is used for each mol of acrylontrile may also be reduced to 0.5 mol. The amount of water may be up to 2 mols per mol acrylonitrile. In other words, ratios of 1 to 2 mols of water and 0.5 to 1 mol of sulfuric acid may be employed per mol of acrylonitrile.

Known inhibitors, such as copper, iron and their compounds, or sulfur, or the organic inhibitors may be added to the reaction mixture. However, it has been found that the process according to the invention may also be performed in the absence of an inhibitor without polymerization of the acrylic acid amide occurring. This fact could not have been foreseen and is of great importance in the further treatment of the aqueous solutions of monomeric acrylic acid amide produced according to the present invention.

Substantially shorter reaction periods than in the previous process are sufficient for the performance of the process according to the invention. As indicated by the curves in the figure, the optimum yield of monomeric acrylic acid amide is reached after a reaction period of 5 to 8 minutes, when the temperature is maintained in the reactor at above 150° C. Under these conditions, even at a reaction temperature of 200° C. or more, practically no polymerization occurs. At reaction temperatures above 200° C. the residence period can be further reduced. However, it is not advantageous to increase the temperature above 250° C. It is further advantageous not to extend the period of heating substantially beyond the period required for achievement of an optimum yield, that is beyond 15 to 20 minutes.

The reaction may be carried out in any type of reactor through which the reactants can be continuously passed while maintaining the desired temperature. We have found that for optimum results, a non-corrosive tube passing through a zone in which the heat can be regulated thermostatically is preferred. Due to the exothermic nature of the reaction, the temperature of the reactants tends to exceed the temperature maintained on the reactor. In order to prevent the reaction from continuing after passage through the heated zone, it is preferable to cool the reaction products as rapidly as possible to room temperature. This can be readily performed in a tubular reactor by passing the tube from the heated zone to a cooled zone before withdrawing the products from the tube. Sufficient pressure should be maintained within the reactor to maintain the reactants in a liquid state, however, normal pressure may be used.

The reaction mixture is worked up, in accordance with known methods, by first neutralizing the sulfuric acid with a base. Hydroxides or carbonates of the alkaline earth metals, especially of calcium, are preferred for this purpose since a difficultly-soluble alkaline earth metal salt is formed thereby which may readily be separated from the solution. However, the neutralization of the sulfuric acid may also be accomplished with the aid of ammonia, ammonium carbonate, soda and the like in an organic solvent in which the salt of the sulfuric acid formed thereby is insoluble. In this manner a solution of the monomeric acrylic acid amide in either water or the particular organic solvent is obtained. These solutions may be directly polymerized by the addition of a suitable catalyst, such as a peroxide. The amide, however, may also be isolated by distilling off the solvent under mild conditions, for example in vacuo, or by spray-drying. The amide obtained in this manner is free from polymeric components and is sufficiently pure for further treatment.

The following examples will enable persons skilled in the art to better understand and practice the invention and are not intended to limit the invention in any manner.

*Example I*

84.5% sulfuric acid, in which 0.68% by weight of $CuSO_4 \cdot 5H_2O$ had been dissolved, and commercial grade acrylonitrile were fed into a mixing nozzle with the aid of two metering pumps in a weight ratio of 11.6:5.3. This is equivalent to a molar ratio of reactants of about 1:1:1. After passing through the nozzle, the mixture is passed into a glass reaction tube having a diameter of 0.5 cm. A length of this tube of 840 cm. was heated to a temperature of 175° C. and maintained at that temperature with the aid of a thermostat. At the end of the heated zone, the reaction mixture had attained a temperature of 200° C. The throughput rate was 3300 gm. of mixture per hour. This corresponds to a residence time of about 4 minutes, 21 seconds in the heated reaction zone. After the reaction zone, the reaction tube was cooled with water and the reaction mixture being passed through was thereby brought to room temperature.

For determination of the yield, 2000 gm. of the cold reaction mixture were withdrawn and poured into 5500 cc. of isopropanol. No turbidity of any kind was formed. Ammonia gas was introduced into the thoroughly cooled solution, accompanied by stirring, until it reacted weakly alkaline. Thereafter, the ammonium sulfate which crystallized out was filtered off and was washed with isopropanol. The isopropanol solutions were combined and the alcohol was distilled off in a vacuum from an aspirator. 775 gm. of crystalline monomeric acrylic acid amide (93% of theory) were obtained as a residue, which formed a clear solution in methanol.

Further tests under otherwise identical conditions but with a residence period of 2 minutes, 6 seconds and 7 minutes, 12 seconds were performed. The yields obtained from these tests may be seen from the figure, curve #1.

As a comparison, additional tests were performed under otherwise identical conditions with the tube maintained with the aid of the thermostat at 155° C. (reaction temperature of the mixture at the end of the heated zone was 180 to 185° C.) and 110° C. (reaction temperature of the mixture at the end of the heated zone was 150 to 170° C.), respectively. The yields obtained thereby are also shown in the figure as curves #2 and #3, respectively, in relation to the residence period in the heated zone.

*Example II*

84.5% sulfuric acid and commercial grade acrylonitrile were fed into the reaction tube as described in Example I in a weight ratio of 11.6:5.3, but without addition of an inhibitor. The heated zone temperature was maintained at 155° C. with the aid of a thermostat. At the end of the heated zone the reaction mixture had attained a temperature of 180 to 185° C. The through-put rate was 2718 gm. of mixture per hour. This corresponds to a residence period in the heated reaction zone of about 5 minutes, 18 seconds.

2000 gm. of the cooled reaction mixture were withdrawn from the reaction tube and were added, accompanied by stirring, to a cold suspension of 1200 parts of calcium carbonate in 5900 parts of water. The precipitated calcium sulfate was removed by filtration and the filter cake was washed twice with 1250 cc. of water.

The clear, aqueous acrylic acid amide solution was heated, while stirring, to 70° C. after adding 8 gm. of calcium persulfate. After 2½ hours the viscous solution was cooled. The polyacrylamide thus formed was precipitated from the aqueous solution with methanol, filtered off and dried. The yield was 715 gm. of polyacrylamide (85% of theory).

While we have described particular embodiments of the invention, it will be understood that the invention is not limited thereto and that various modifications and adaptations thereof my be made without departing from the spirit of the invention and the scope of the following claims.

We claim:

1. In a continuous process for the production of monomeric acrylic acid amide which comprises continuously passing a mixture of acrylonitrile, sulfuric acid and water, said mixture containing a ratio of about 1 to 2 mols of water and about 0.5 to 1 mol of sulfuric acid for each mol of acrylonitrile, through a heated reaction zone, cooling the reacted mixture and separating monomeric acrylic acid amide from the cooled reacted mixture, the improvement which comprises maintaining said heated reaction zone at a temperature between about 150° C. and about 250° C. and maintaining said reaction mixture in said heated reaction zone for a residence time of less than 20 minutes.

2. The process of claim 1 wherein the said acrylonitrile, sulfuric acid and water are present in said mixture in substantially equimolar proportions.

3. The process of claim 1 wherein said reaction is conducted in the absence of polymerization inhibitors.

4. The process of claim 1 wherein said reaction is conducted in the presence of conventional polymerization inhibitors.

5. A continuous process for the production of monomeric acrylic acid amide which comprises continuously passing a mixture of substantially equimolar proportions of acrylonitrile, sulfuric acid and water through a reaction zone heated to a temperature between about 150° C. and about 200° C. for a residence time in the heated reaction zone of less than 15 minutes, immediately thereafter passing the reacted mixture through a cooling zone and separating said monomeric acrylic acid amide from the cooled reacted mixture.

6. A continuous process for the production of monomeric acrylic acid amide which comprises continuously passing a mixture of substantially equimolar proportions of acrylonitrile, sulfuric acid and water, said mixture containing a small but effective amount of a copper salt inhibitor, through a reaction zone heated to a temperature between about 150° C. and about 200° C. for a residence time in the heated reaction zone of less than 15 minutes, immediately thereafter passing the reacted mixture through a cooling zone and separating said monomeric acrylic acid amide from the cooled reacted mixture.

References Cited in the file of this patent

UNITED STATES PATENTS

| | | |
|---|---|---|
| 2,683,173 | Weisgerber | July 6, 1954 |
| 2,683,741 | Wiley | July 13, 1954 |
| 2,690,454 | Strain et al. | Sept. 28, 1954 |
| 2,719,176 | Coover et al. | Sept. 27, 1955 |

FOREIGN PATENTS

| | | |
|---|---|---|
| 631,592 | Great Britain | Nov. 7, 1949 |